US012696091B2

(12) United States Patent
Peng et al.

(10) Patent No.: US 12,696,091 B2
(45) Date of Patent: Jul. 28, 2026

(54) SECURITY METHODS FOR PROTECTING DISCOVERY PROCEDURES IN WIRELESS NETWORKS

(71) Applicant: ZTE Corporation, Shenzhen (CN)

(72) Inventors: Jin Peng, Shenzhen (CN); Shilin You, Shenzhen (CN); Yuze Liu, Shenzhen (CN); Zhen Xing, Shenzhen (CN); Zhaoji Lin, Shenzhen (CN)

(73) Assignee: ZTE Corporation, Shenzhen Guangdong (CN)

( * ) Notice: Subject to any disclaimer, the term of this patent is extended or adjusted under 35 U.S.C. 154(b) by 399 days.

(21) Appl. No.: 18/458,796

(22) Filed: Aug. 30, 2023

(65) Prior Publication Data

US 2023/0413055 A1      Dec. 21, 2023

Related U.S. Application Data

(63) Continuation of application No. PCT/CN2021/107503, filed on Jul. 21, 2021.

(51) Int. Cl.
*H04W 12/106* (2021.01)
*H04W 12/041* (2021.01)
*H04W 48/16* (2009.01)

(52) U.S. Cl.
CPC ....... *H04W 12/106* (2021.01); *H04W 12/041* (2021.01); *H04W 48/16* (2013.01)

(58) Field of Classification Search
CPC ...................... H04L 2463/061; H04W 12/106
USPC ........................................................ 455/410
See application file for complete search history.

(56) References Cited

U.S. PATENT DOCUMENTS

| | | | | |
|---|---|---|---|---|
| 2016/0234020 A1* | 8/2016 | Nix | ..................... | H04W 40/005 |
| 2017/0374549 A1 | 12/2017 | Anil et al. | | |
| 2018/0279120 A1 | 9/2018 | Lehtovirta et al. | | |
| 2018/0295515 A1* | 10/2018 | Lehtovirta | ............ | H04W 12/06 |
| 2019/0223063 A1* | 7/2019 | Palanigounder | ...... | H04W 12/06 |
| 2020/0007335 A1* | 1/2020 | Tan | ........................... | H04L 9/32 |

(Continued)

FOREIGN PATENT DOCUMENTS

| | | |
|---|---|---|
| CN | 107852418 | 3/2018 |
| CN | 112512043 | 3/2021 |
| WO | 2016/164493 | 10/2016 |

OTHER PUBLICATIONS

International Search Report and Written Opinion for PCT/CN2021/107503, filed Jul. 21, 2021, Report dated Apr. 20, 2022, 9 pages.

(Continued)

*Primary Examiner* — Fabricio R Murillo Garcia
(74) *Attorney, Agent, or Firm* — Perkins Coie LLP

(57)      ABSTRACT

This patent document describes, among other things, techniques, and apparatuses for a security method of discovery in proximity-based services. In one aspect, a method of wireless communication is disclosed. The method includes transmitting, by a wireless device to a first network function, an encrypted and integrity-protected message, wherein the encrypted and integrity-protected message is encrypted using a first key that is derived from a second key, wherein the wireless device has established the second key using a communication with a second network function, and wherein the encrypted and integrity-protected message is obtained by encrypting and integrity-protecting a message.

20 Claims, 10 Drawing Sheets

(56) References Cited

U.S. PATENT DOCUMENTS

| 2022/0095104 | A1 * | 3/2022 | Ben Henda | ....... | H04W 12/0433 |
|---|---|---|---|---|---|
| 2023/0188997 | A1 * | 6/2023 | Li | .................... | H04W 12/0431 |
| | | | | | 713/171 |
| 2023/0354013 | A1 * | 11/2023 | Li | ........................ | H04W 12/02 |

OTHER PUBLICATIONS

EPO, Communication pursuant to Article 94(3) EPC for European Application No. 21 950 453.7, mailed on Sep. 30, 2025, 7 pages.

European Extended Search Report for co-pending EP Application No. 21950453.7, dated Jan. 22, 2024, 7 pages.

3rd Generation Partnership Project "Technical Specification Group Services and System Aspects; Study on security aspects of enhancement for proximity based services in the 5G System (5GS)" (Release 17), 3GPP TR 33.847 V0.5.0 (Mar. 2021), 17 pages.

3rd Generation Partnership Project "Technical Specification Group Services and System Aspects; Authentication and key management for applications; based on 3GPP credential in 5G (AKMA) " (Release 16), 3GPP TS 33.535 V0.4.0 (Apr. 2020), 15 Pages.

IPOS, Written Opinion for Singaporean Application No. 11202305681V, mailed on Dec. 31, 2025, 9 pages.

* cited by examiner

Transmit, by a wireless device to a first network function, an encrypted and integrity-protected message, wherein the encrypted and integrity-protected message is encrypted using a first key that is derived from a second key, wherein the wireless device has established the second key using a communication with a second network function, and wherein the encrypted and integrity-protected message is obtained by encrypting and integrity-protecting a message.

810

Receive, by a first network function, an encrypted and integrity-protected message from a wireless device.
910

Decrypt the encrypted and integrity-protected message using a first key that is derived from a second key, wherein the encrypted and integrity-protected message is obtained by encrypting and integrity-protecting a message using the first key, and wherein the second key is established using a communication between the wireless device and a second network function.
920

SECURITY METHODS FOR PROTECTING DISCOVERY PROCEDURES IN WIRELESS NETWORKS

CROSS-REFERENCE TO RELATED APPLICATION

This application is a continuation and claims priority to International Application No. PCT/CN2021/107503, filed on Jul. 21, 2021, the disclosure of which is hereby incorporated by reference herein in its entirety.

TECHNICAL FIELD

This patent document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support an increasingly mobile society.

SUMMARY

This patent document describes, among other things, techniques, and apparatuses for a security method of discovery in 5G Proximity-based Services (5G ProSe). The disclosed technology can be implemented in some embodiments to provide security methods for protecting discovery request and discovery response messages at the PC3 interface.

In one aspect, a method of wireless communication is disclosed. The method includes transmitting, by a wireless device to a first network function, an encrypted and integrity-protected message, wherein the encrypted and integrity-protected message is encrypted using a first key that is derived from a second key, wherein the wireless device has established the second key using a communication with a second network function, and wherein the encrypted and integrity-protected message is obtained by encrypting and integrity-protecting a message.

In another aspect, another method for wireless communications is disclosed. The method includes receiving, by a first network function, an encrypted and integrity-protected message from a wireless device, and decrypting the encrypted and integrity-protected message using a first key that is derived from a second key, wherein the encrypted and integrity-protected message is obtained by encrypting and integrity-protecting a message using the first key, and wherein the second key is established using a communication between the wireless device and a second network function.

In another aspect, a wireless communication device is disclosed. The device includes one or more processors configured to generate an encrypted and integrity-protected message, and a transceiver configured to transmit the encrypted and integrity-protected message to a first network function, wherein the encrypted and integrity-protected message is encrypted using a first key that is derived from a second key, wherein the second key is established using a communication with a second network function, and wherein the encrypted and integrity-protected message is obtained by encrypting and integrity-protecting a message.

In another aspect, a network device is disclosed. The device includes a transceiver configured to receive an encrypted and integrity-protected message from a wireless device, and one or more processors configured to perform a first network function including decrypting the encrypted and integrity-protected message using a first key that is derived from a second key, wherein the encrypted and integrity-protected message is obtained by encrypting and integrity-protecting a message using the first key, and wherein the second key is established using a communication between the wireless device and a second network function.

In another aspect, a wireless communication apparatus comprising a processor configured to implement a method described herein is disclosed.

In another aspect, computer readable medium including executable instructions to implement a method described herein is disclosed.

These, and other, aspects are described in the present document.

BRIEF DESCRIPTION OF DRAWINGS

FIG. 8 shows an example of a wireless communication method based on some embodiments of the disclosed technology.

FIG. 9 shows another example of a wireless communication method based on some embodiments of the disclosed technology.

DETAILED DESCRIPTION

Figure 1:
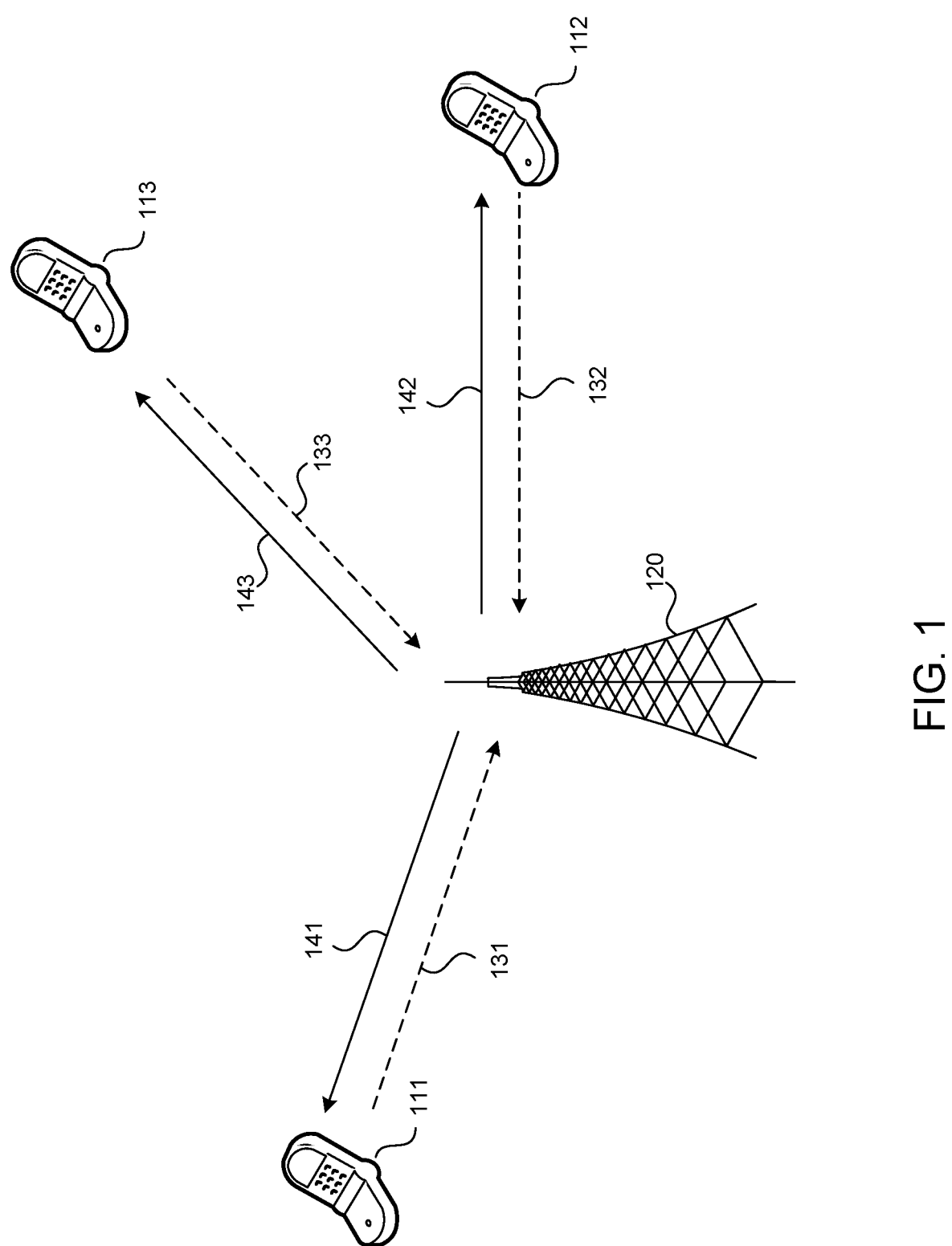
FIG. 1 shows an example of a base station (BS) and user equipment (UE) in wireless communication.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

Figure 2:
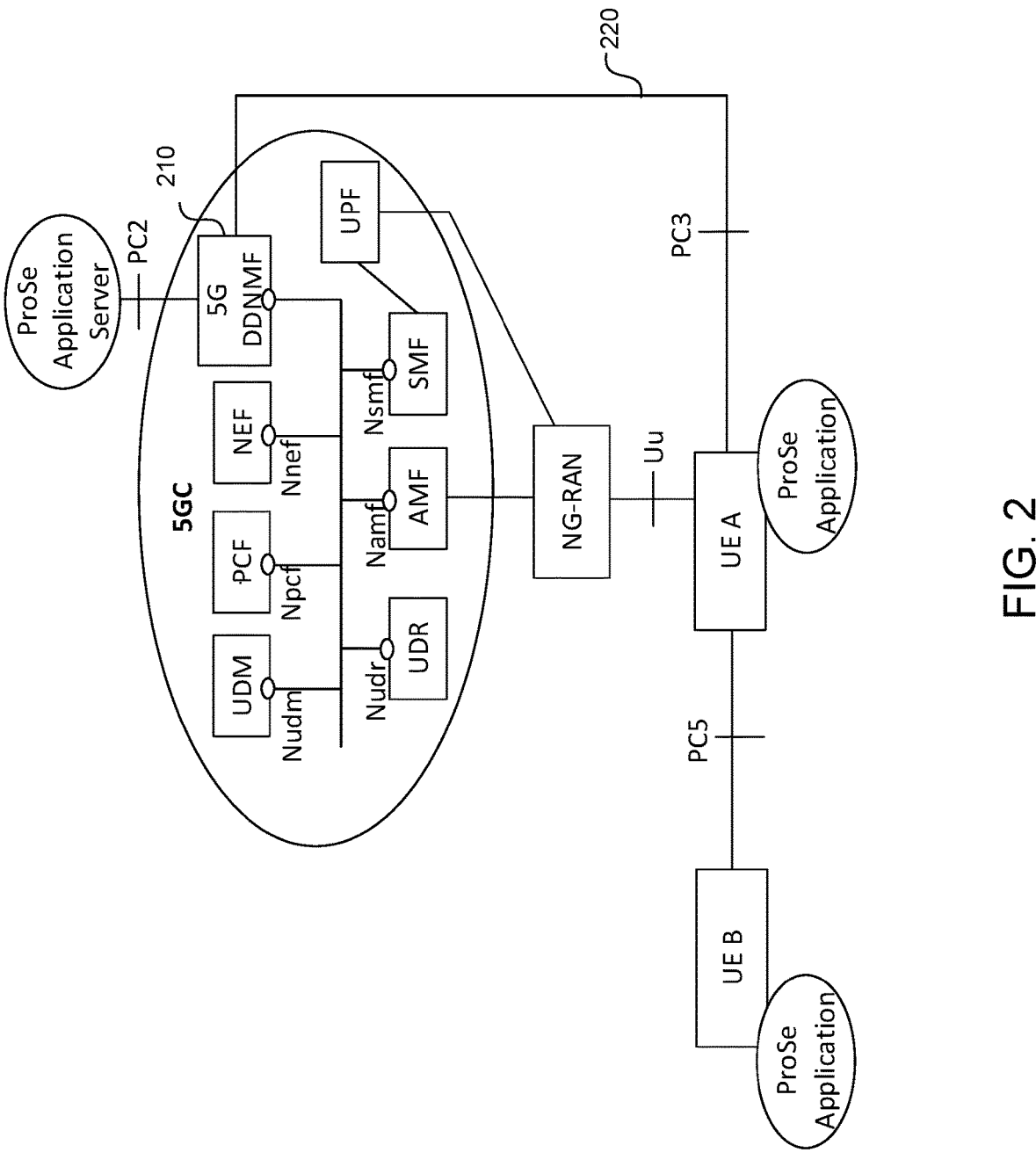
FIG. 2 shows an example architecture for proximity-based services (ProSe).

FIG. 2 shows an example architecture for proximity-based services (ProSe).

In some implementations, Direct Discovery Name Management Function (DDNMF) 210 supports ProSe in 5G system architecture. DDNMF 210 is used to provide following procedures over PC3 interface 220: discovery request/response procedures to provide IDs and filter for direct discovery; match report procedures to check direct discovery and provide mapping information for direct discovery; announcing alert procedures to support "on-demand" ProSe direct discovery in case of ProSe restricted discovery model A; discovery update procedures to update/revoke a previously allocated IDs, filters.

In some implementations, PC3 interface 220 supports discovery request/responses, match report procedures, announcing alert procedures, and discovery update procedures.

Figure 3:
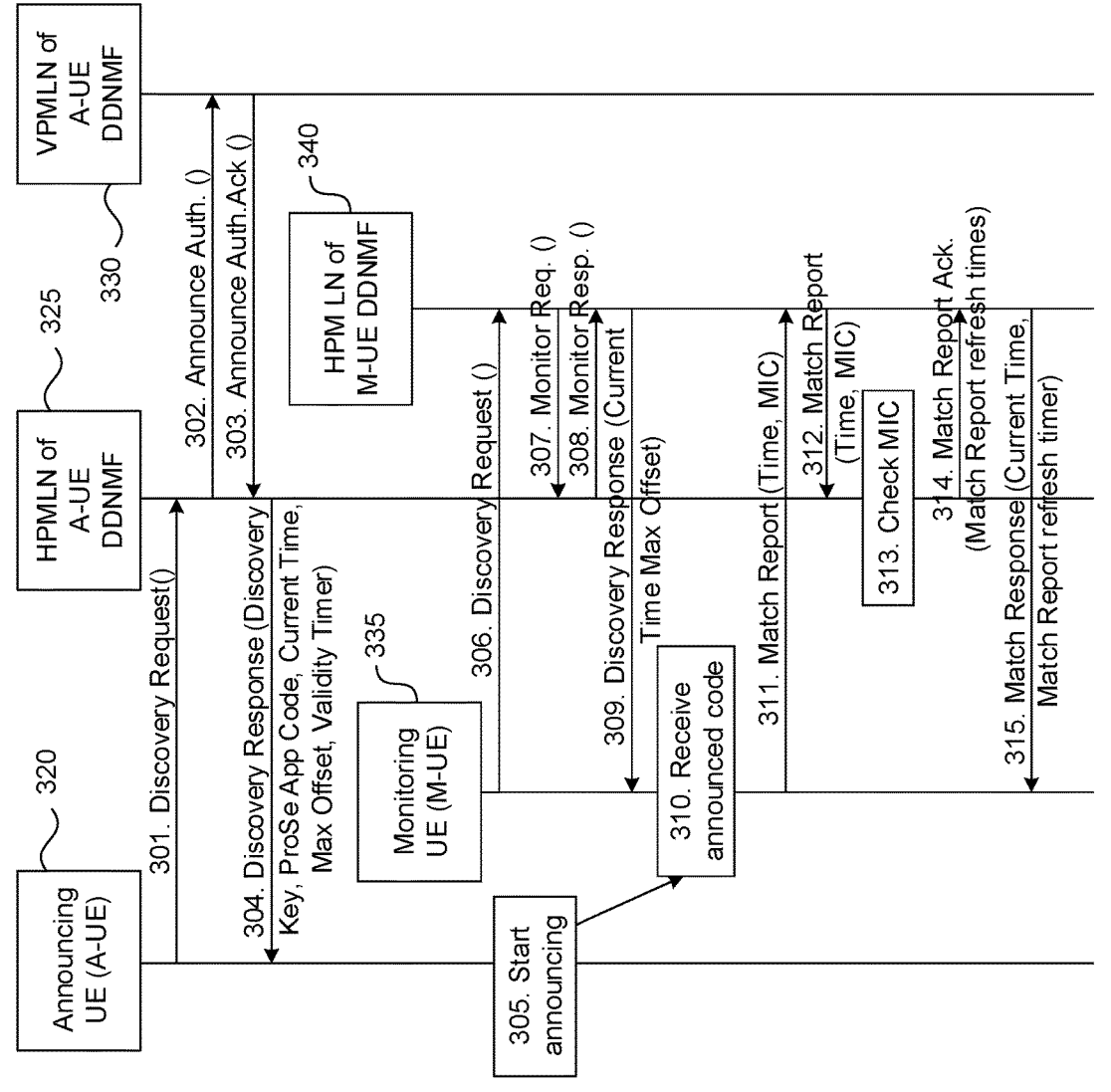
FIG. 3 shows an example of open discovery security procedure.

FIG. 3 shows an example of open discovery security procedure.

In some implementations, the open discovery security procedure can include the following operations. The announcing UE sends a discovery request message containing a ProSe application ID to the DDNMF in its home public land mobile network (HPLMN) in order to be allowed to announce a code on its serving public land mobile network (PLMN) (either visited PLMN (VPLMN) or HPLMN).

If the announcing UE wants to send announcements in the VPLMN, it needs to be authorized from the VPLMN ProSe function. The DDNMF in the HPLMN requests authorization from the VPLMN DDNMF by sending an announce authorization message.

The VPLMN DDNMF responds with an announce authorization acknowledgement message, if authorization is granted. There are no changes to these messages for the purpose of protecting the transmitted code for open discovery. If the announcing UE is not roaming, these operations do not take place.

The DDNMF in HPLMN of the announcing UE returns the ProSe App Code that the announcing UE can announce a Discovery Key associated with it. The DDNMF stores the Discovery Key with the ProSe App Code. In addition, the DDNMF provides the UE with a CURRENT_TIME parameter, which contains the current UTC-based time at the DDNMF, a MAX_OFFSET parameter, and a Validity Timer. The UE sets a clock which is used for ProSe authentication (e.g., ProSe clock) to the value of CURRENT_TIME and the UE stores the MAX_OFFSET parameter, overwriting any previous values. The announcing UE obtains a value for a UTC-based counter associated with a discovery slot based on UTC time. The counter is set to a value of UTC time in a granularity of seconds. The UE may obtain UTC time from any sources available, e.g. the RAN via SIB16, NITZ, NTP, GPS, via Ub interface (in GBA) (depending on which is available).

The UE starts announcing, if the difference between UTC-based counter provided by the system associated with the discovery slot and the UE's ProSe clock is not greater than the MAX_OFFSET and if the Validity Timer has not expired. For each discovery slot it uses to announce, the announcing UE calculates a 32-bit Message Integrity Check (MIC) to include with the ProSe App Code in the discovery message. Four least significant bits of UTC-based counter are transmitted along with the discovery message. The MIC is calculated using the Discovery Key and the UTC-based counter associated with the discovery slot.

The monitoring UE sends a discovery request message containing the ProSe Application ID to the DDNMF in its HPLMN in order to get the Discovery Filters that it wants to listen for.

The DDNMF in the HPLMN of the monitoring UE sends Monitor Req. message to the DDNMF in the HPLMN of the announcing.

The DDNMF in the HPLMN of the announcing UE sends Monitor Resp. message to the DDNMF in the HPLMN of the monitoring. If MIC needs to be checked by the DDNMF in the HPLMN of the monitoring UE or the monitoring UE, the Discovery Key should be contained in the response message.

The DDNMF returns the Discovery Filter containing either the ProSe App Code(s), the ProSe App Mask(s) or both along with the CURRENT_TIME and the MAX_OFFSET parameters.

The UE sets its ProSe clock to CURRENT_TIME and stores the MAX_OFFSET parameter, overwriting any previous values. The monitoring UE obtains a value for a UTC-based counter associated with a discovery slot based on UTC time. The counter is set to a value of UTC time in a granularity of seconds. The UE may obtain UTC time from any sources available, e.g. the RAN via SIB16, NITZ, NTP, GPS (depending on which is available). If MIC needs to be checked by the monitoring UE, the Discovery Key should be contained in the response message.

The monitoring UE listens for a discovery message that satisfies its Discovery Filter, if the difference between UTC-based counter associated with that discovery slot and UE's ProSe clock is not greater than the MAX_OFFSET of the monitoring UE's ProSe clock. If the monitoring UE has the Discovery Key, the MIC check is performed locally, and operations 311 to 315 shown in FIG. 3 may be omitted.

On hearing such a discovery message, and if the UE needs to check the MIC for the discovered ProSe App Code, the monitoring UE sends a Match Report message to the DDNMF in the HPLMN of the monitoring UE. The Match Report contains the UTC-based counter value with four least significant bits equal to four least significant bits received along with discovery message and nearest to the monitoring UE's UTC-based counter associated with the discovery slot where it heard the announcement, and other discovery message parameters including the ProSe App Code and MIC. If the DDNMF in the HPLMN of the monitoring UE has the Discovery Key, the MIC check is performed locally, and operations 312 to 314 shown in FIG. 3 may be omitted.

The DDNMF in the HPLMN of the monitoring UE passes the discovery message parameters including the ProSe App Code and MIC and associated counter parameter to the DDNMF in the HPLMN of the announcing UE in the Match Report message.

The DDNMF in the HPLMN of the announcing UE should check the MIC is valid. The relevant Discovery Key is found using the ProSe App Code.

The DDNMF in the HPLMN of the announcing UE should acknowledge a successful check of the MIC to the DDNMF in the HPLMN of the monitoring UE in the Match Report Ack message.

The DDNMF in the HPLMN of the announcing UE include a Match Report refresh timer in the Match Report Ack message. The Match Report refresh timer indicates how long the UE will wait before sending a new Match Report for the ProSe App Code.

The DDNMF in the HPLMN of the monitoring UE acknowledges the check result to the monitoring UE. The DDNMF returns the parameter ProSe Application ID to the UE. It also provides the CURRENT_TIME parameter, by which the UE (re)sets its ProSe clock The DDNMF in the HPLMN of the monitoring UE may optionally modify the received Match Report refresh timer based on local policy and then include the Match Report refresh timer in the message to the monitoring UE.

The disclosed technology can be used to protect discovery request/response and Match Report/Response messages between UE and DDNMF (e.g., operations 301, 304, 306, 309, 311 and 315 in FIG. 3).

In some implementations, Authentication and Key Management for Applications (AKMA) and Transport Layer Security (TLS) are needed to provide the security protection to the PC3 interface. However, the disclosed technology can be used in some embodiments to provide the security protection to messages that are transmitted via the PC3 interface using AKMA without requiring support for TLS.

Figure 4:
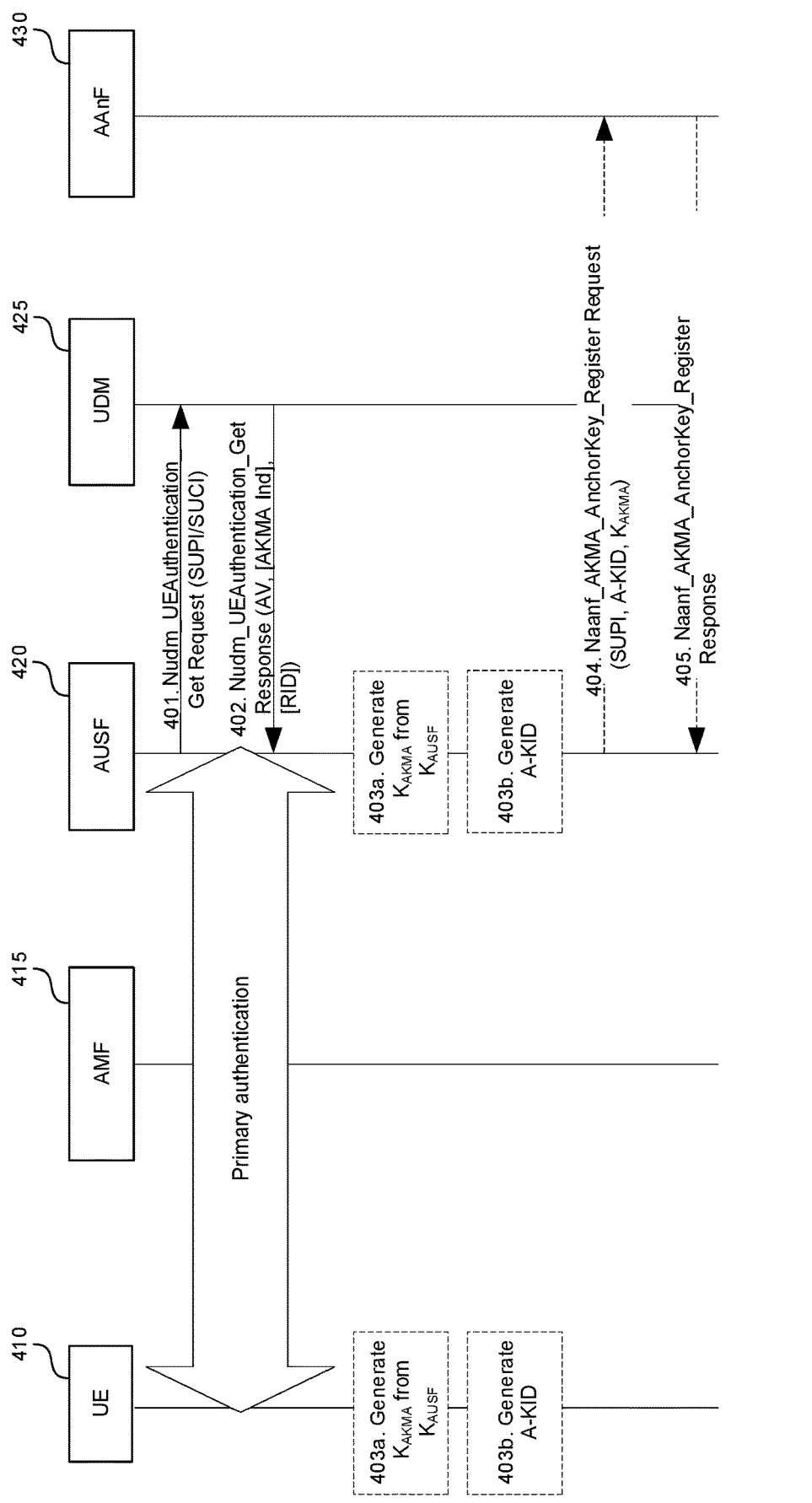
FIG. 4 shows an example of $K_{AKMA}$ derivation after primary authentication.

FIG. 4 shows an example of $K_{AKMA}$ derivation after primary authentication.

In some implementations, after the primary authentication, $K_{AKMA}$ can be derived by performing the following operations. The authentication server function (AUSF), during the primary authentication procedure, interacts with Unified Data Management (UDM) in order to fetch authentication information such as subscription credentials (e.g. AKA Authentication vectors) and the authentication method using the Nudm_UEAuthentication_Get Request service operation (e.g., operation 401 in FIG. 4).

In the response, Unified Data Management (UDM) may also indicate to the AUSF whether AKMA keys need to be generated for the UE (e.g., operation 402 in FIG. 4).

If the AUSF receives the AKMA indication from the UDM, the AUSF may store the $K_{AUSF}$ and generate the AKMA Anchor Key ($K_{AKMA}$) and the A-KID from $K_{AUSF}$ after the primary authentication procedure is successfully completed.

After AKMA key material is generated, the AUSF may send the generated A-KID, and $K_{AKMA}$ to AKMA Anchor Function (AAnF) together with the SUPI of the UE using the Naanf_AKMA_KeyRegistration Request service operation. The AAnF may store the latest information sent by the AUSF (e.g., operation 404).

The AAnF sends the response to the AUSF using the Naanf_AKMA_AnchorKey_Register Response service operation (e.g., operation 405 in FIG. 4).

Figure 5:
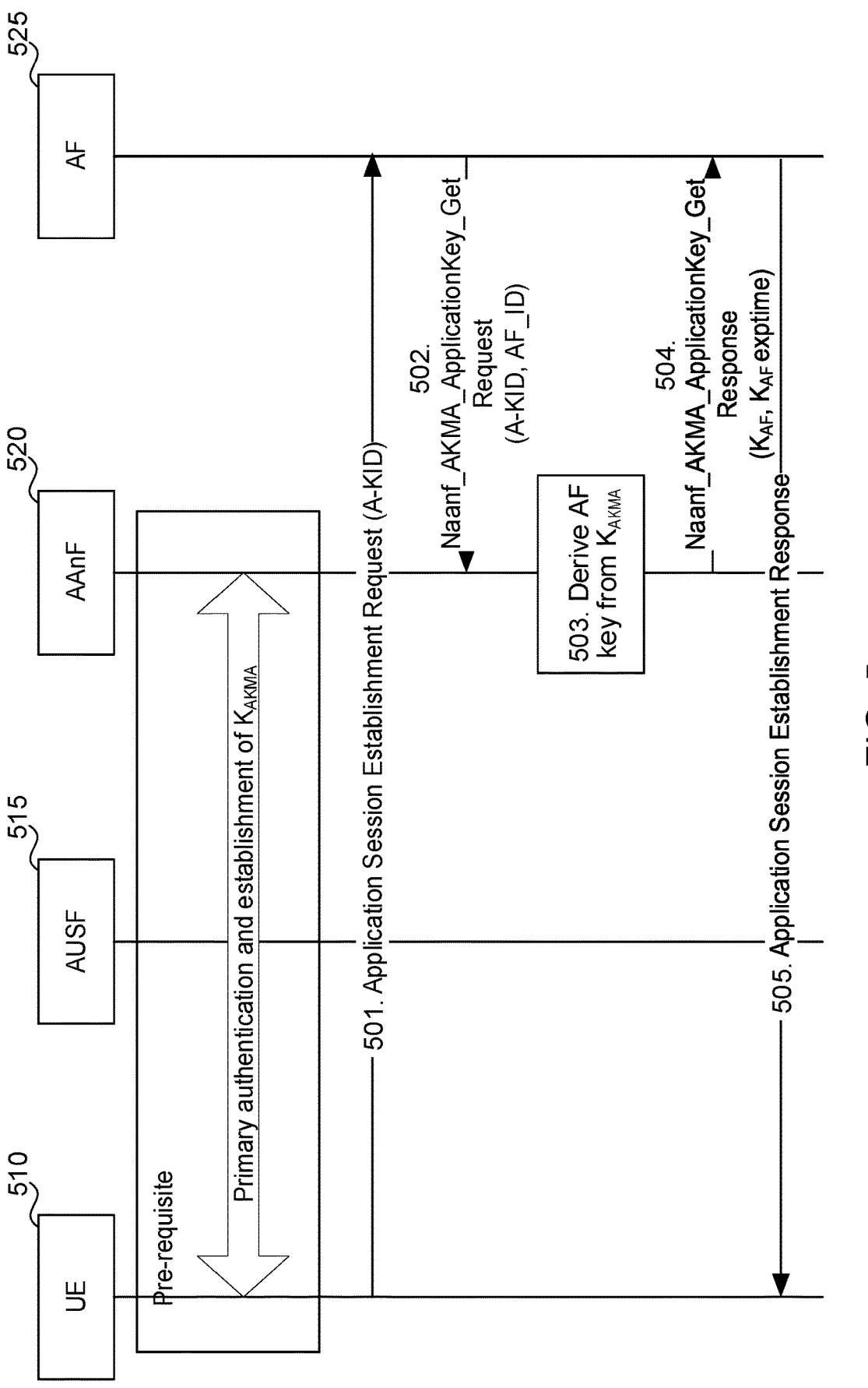
FIG. 5 shows an example of $K_{AF}$ generation from $K_{AK}$MA.

FIG. 5 shows an example of $K_{AF}$ generation from AKMA.

In some implementations, the application function (AF) can request application function specific AKMA keys from the AAnF by using the following operations.

Before communication between the UE and the AKMA AF can start, the UE and the AKMA AF need to know whether to use AKMA. This can be implicit to the specific application on the UE and the AKMA AF or indicated by the AKMA AF to the UE.

The UE may generate the AKMA Anchor Key ($K_{AKMA}$) and the A-KID from the $K_{AUSF}$ before initiating communication with an AKMA Application Function. When the UE initiates communication with the AKMA AF, it may include the derived A-KID in the Application Session Establishment request message (e.g., operation 501 in FIG. 5).

If the AF does not have an active context associated with the A-KID, then the AF sends a Naanf_AKMA_ApplicationKey_Get request to AAnF with the A-KID to request the $K_{AF}$ for the UE. The AF also includes its identity (AF ID) in the request (e.g., operation 502 in FIG. 5).

The AAnF derives the AKMA Application Key ($K_{AF}$) from $K_{AKMA}$ if it does not already have $K_{AF}$ (e.g., operation 503 in FIG. 5).

The AAnF sends Naanf_AKMA_ApplicationKey_Get response to the AF with $K_{AF}$ and the $K_{AF}$ expiration time (e.g., operation 504 in FIG. 5).

The AF sends the Application Session Establishment Response to the UE. If the information in operation 504 indicates failure of AKMA key request, the AF may reject the Application Session Establishment by including a failure cause. Afterwards, UE may trigger a new Application Session Establishment request with the latest A-KID to the AKMA AF (e.g., operation 505 in FIG. 5).

Figure 6:
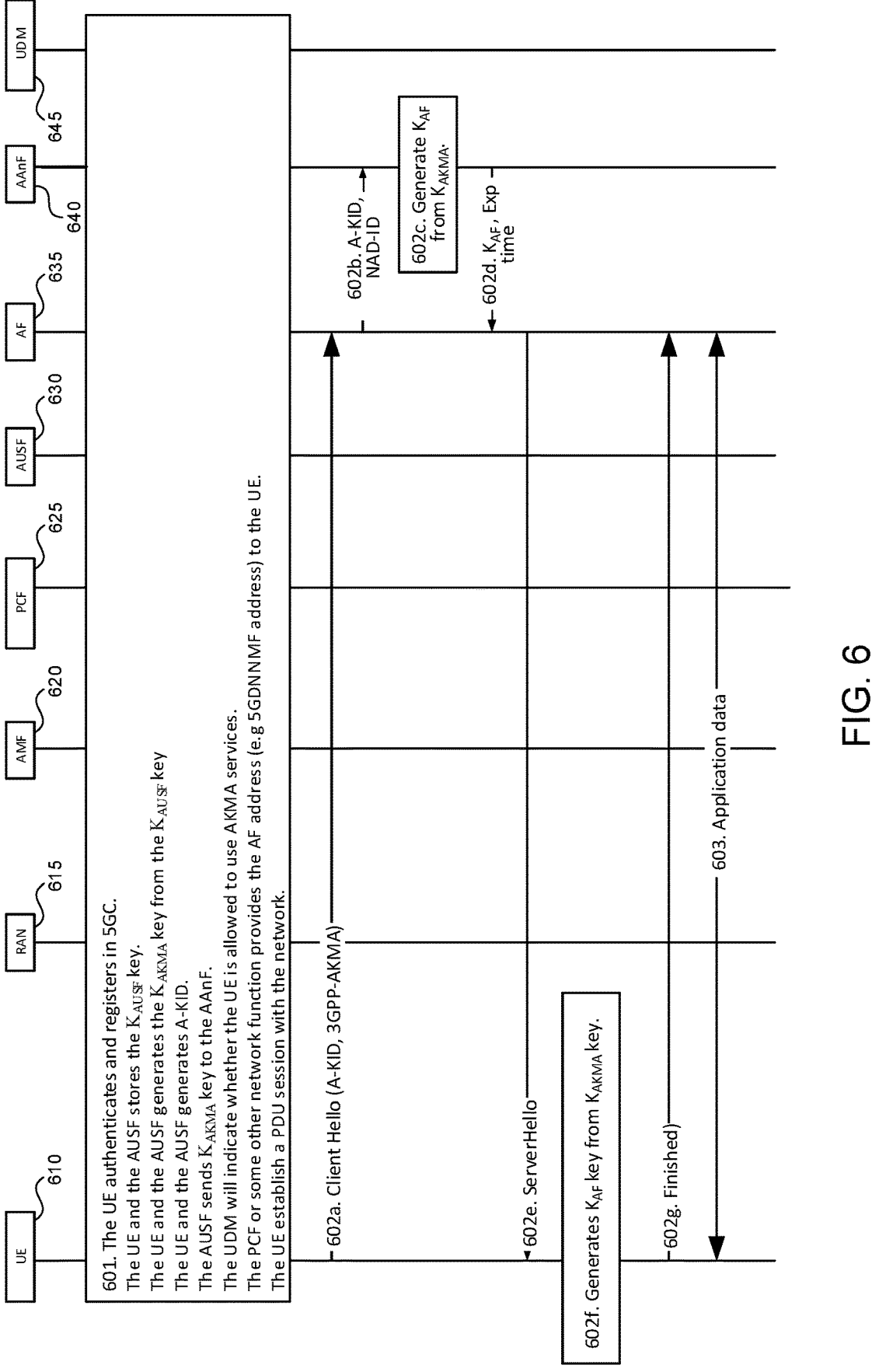
FIG. 6 shows an example procedure for security protection of the PC3 interface.

FIG. 6 shows an example procedure for security protection of the PC3 interface between the AF (e.g., 5GDDNMF) and the UE.

In some implementations, the security of the PC3 interface can be protected by performing the following operations.

At operation 601, the UE mutually authenticates with and registers in the 5GC. As part of the UE authentication with the 5GC, the UE and the AUSF store a $K_{AUSF}$. Additionally, the UE and the AUSF generate AKMA Key material (e.g., $K_{AKMA}$ and A-KID) and the AUSF sends this material to the AAnF. The Unified Data Management (UDM) will indicate whether the UE is allowed to use AKMA services. The Policy Control Function (PCF) provides the AF address (e.g., 5GDNNMF address) to the UE and the UE establish Protocol Data Unit (PDU) session with the network.

At operation 602a, the UE initiates TLS with Pre-Shared Key (PSK) authentication with the AF server. The UE sends Client Hello where the ClientHello contains a pre_shared_key extension including a PSK identity formatted from A-KID and 3GPP-akma hint together with a psk_key_exchange_modes extension indicating, e.g., psk_dhe_ke.

At operation 602b, the AF server contacts the AAnF with the A-KID.

At operation 602c, the AAnF looks up the $K_{AKMA}$ key using the A-KID and generates a $K_{AF}$ key from the $K_{AKMA}$ key.

At operation 602d, the AAnF server responds with the $K_{AF}$ key and the expiration time for the $K_{AF}$ key to the AF.

At operation 602e, the AF server responds with a Server Hello with a pre_shared_key extension indicating the chosen PSK identity.

At operation 602f, the UE generates $K_{AF}$ from $K_{AKMA}$.

At operation 602g, the UE responds with a Finished message.

At operation 603, the UE and the AF server can exchange application data over a secured link.

Figure 7:
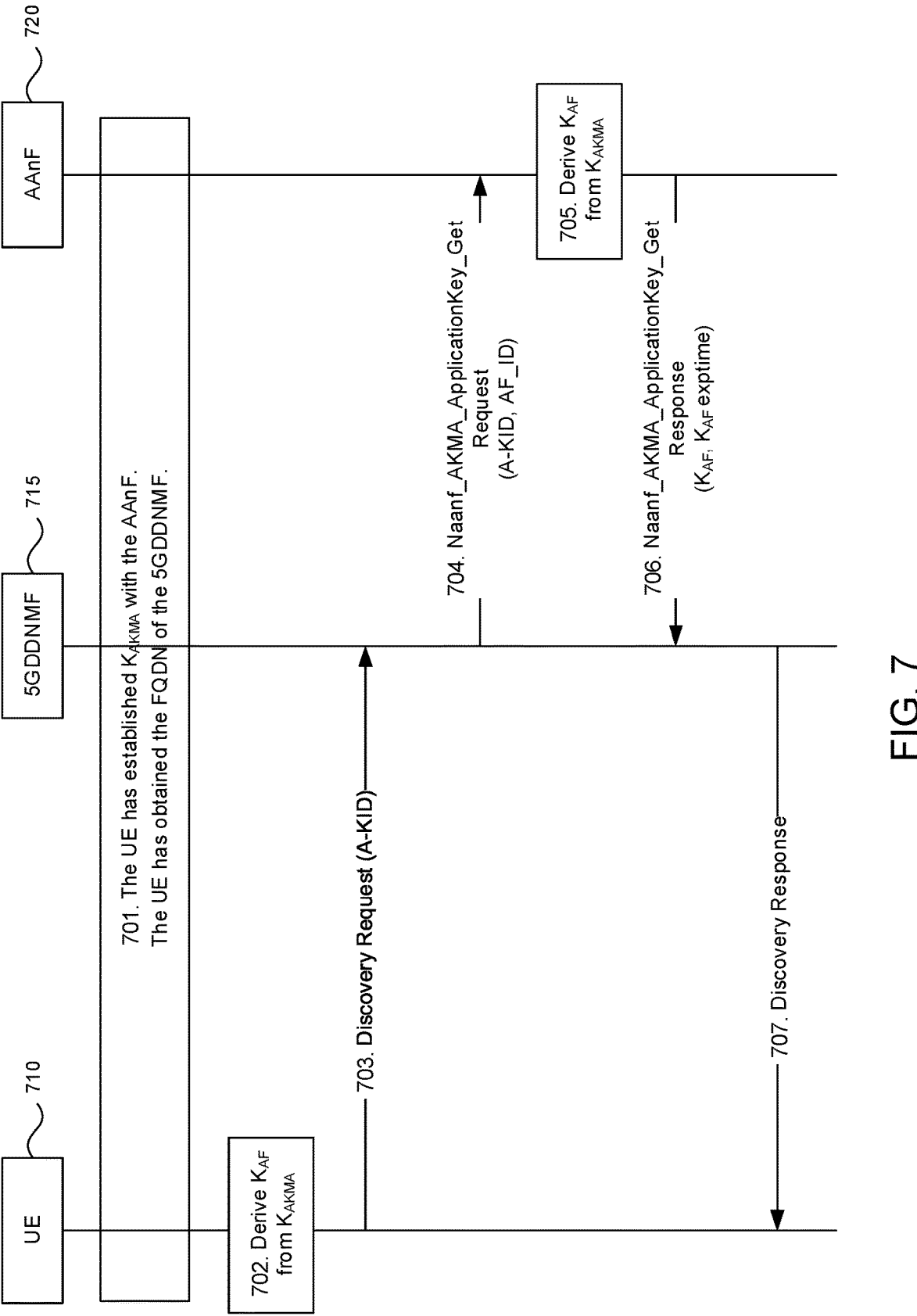
FIG. 7 shows an example procedure for security protection based on some embodiments of the disclosed technology.

FIG. 7 shows an example procedure for security protection based on some embodiments of the disclosed technology.

The disclosed technology can be implemented in some embodiments to provide security methods for protecting messages such as discovery request and discovery response messages at an interface such as the PC3 interface without requiring support for TLS.

At operation 701, the UE establishes $K_{AKMA}$ and the corresponding A-KID with the AAnF and obtains Fully Qualified Domain Name (FQDN) of the 5GDDNMF.

At operation 702, before sending messages to the 5GDDNMF, the UE derives the $K_{AF}$ for the 5GDDNMF from the $K_{AKMA}$. The UE may further derive an encryption key $K_{enc}$ and an integrity key $K_{int}$ from the $K_{AF}$. In some implementations, a key derivation function (KDF) of $K_{enc}\|K_{int}$ can be used to derive the encryption key $K_{enc}$ and the integrity key $K_{int}$ from the $K_{AF}$. When deriving the $K_{enc}||K_{int}$ from the $K_{AF}$, the following parameters can be used to form the input S to the KDF:

P0="AKMA-CK-IK";

L0=length of "AKMA-CK-IK"; (i.e. 0x00 0x0a)

Here, the input key KEY can be $K_{AF}$.

The UE protects the messages to be sent with the key derived. In one example, the UE encrypts the messages to be sent with the $K_{enc}$ and calculates Message Authentication code (MAC) for the messages with the $K_{int}$ if the $K_{enc}$ and the $K_{int}$ are available. In another example, the UE encrypts the messages to be sent and calculates the MAC for the messages with the KAF.

At operation 703, the UE sends a discovery request message to the 5GDDNMF. The discovery request message can include the A-KID as clear text. Other contents of the message can be encrypted. The discovery request message can also include the MAC.

At operation 704, if the 5GDDNMF does not have an active context associated with the A-KID, then the 5GDDNMF sends a Naanf_AKMA_ApplicationKey_Get request to AAnF with the A-KID to request the $K_{AF}$ for the UE. The 5GDDNMF also includes its identity (AF_ID) in the request. AF_ID can include the FQDN of the 5GDDNMF and Ua* security protocol identifier. The latter parameter identifies the security protocol that the AF will use with the UE.

The AAnF can check whether the AAnF can provide the service to the 5GDDNMF based on the configured local policy or based on authorization information or policy provided by the NRF using the AF_ID. If it succeeds, the following procedures are executed. Otherwise, the AAnF can reject the procedure: (1) the AAnF can verify whether the subscriber is authorized to use AKMA based on the presence of the UE specific KAKMA key identified by the A-KID; (2) if KAKMA is present in AAnF, the AAnF can continue with operation 705; and (3) if KAKMA is not present in the AAnF, the AAnF can continue with operation 706 with an error response.

At operation 705, the AAnF derives the AKMA Application Key ($K_{AF}$) from $K_{AKMA}$ if it does not already have $K_{AF}$. The key derivation of KAF can be performed as specified in Annex A.4 in the 3GPP TS 33.535.

At operation 706, the AAnF sends Naanf_AKMA_ApplicationKey_Get response to the AF with $K_{AF}$ and the $K_{AF}$ expiration time.

At operation 707, the 5GDDNMF derives the Kenc and the Kint from the KAF using the key derivation function (KDF) of Kenc||Kint discussed above. The 5GDDNMF checks the MAC of the discovery request message by using the Kint. If it succeeds, the 5GDDNMF decrypts the discovery request message by using the Kenc. If the Discovery request message is protected with the KAF by the UE, the 5GDDNMF checks the MAC and decrypts the discovery request message by using the KAF. The 5GDDNMF protects the Discovery Response message to be sent with the key derived. The UE encrypts the message to be sent with the $K_{enc}$ and calculates the MAC for the message with the Kint if the Kenc and the Kint are available. Otherwise the 5GDDNMF encrypts the message to be sent and calculates the MAC for the message with the KAF. The 5GDDNMF sends the discovery response to the UE. The UE checks the integrity and decrypts the received discovery response message. If the information sent at operation 706 indicates failure of AKMA key request, the 5GDDNMF can reject the discovery request by including a failure cause. Afterwards, UE may trigger a new discovery request with the latest A-KID to the AKMA AF.

In some implementations, the UE encrypts and integrity-protects the discovery request message before sending it to the 5GDDNMF. The 5GDDNMF checks the integrity and decrypts the received discovery request message. The 5GDDNMF encrypts and integrity-protects the discovery response message before sending it to the UE. The UE checks the integrity and decrypts the received discovery response message. In one example, if the $K_{enc}$ and $K_{int}$ are derived, they are used to encrypt and integrity-protect the messages between the UE and the 5GDDNMF. In another example, the $K_{AF}$ is used to encrypt and integrity protect the messages between the UE and the 5GDDNMF. In some implementations, the disclosed technology can be used to encrypt/decrypt and integrity-protect messages other than the discovery request/response messages.

FIG. 8 shows an example of a wireless communication method based on some embodiments of the disclosed technology.

In some embodiments of the disclosed technology, a wireless communication method 800 includes, at 810, transmitting, by a wireless device to a first network function, an encrypted and integrity-protected message, wherein the encrypted and integrity-protected message is encrypted using a first key that is derived from a second key, wherein the wireless device has established the second key using a communication with a second network function, and wherein the encrypted and integrity-protected message is obtained by encrypting and integrity-protecting a message.

In one example, the wireless device may include UE, the first network function may include 5GDDNMF, the second network function may include AAnF, the first key may include $K_{AF}$, and the second key may include $K_{AKMA}$.

FIG. 9 shows another example of a wireless communication method based on some embodiments of the disclosed technology.

In some embodiments of the disclosed technology, a wireless communication method 800 includes, at 910, receiving, by a first network function, an encrypted and integrity-protected message from a wireless device, and at 920, decrypting the encrypted and integrity-protected message using a first key that is derived from a second key, wherein the encrypted and integrity-protected message is obtained by encrypting and integrity-protecting a message using the first key, and wherein the second key is established using a communication between the wireless device and a second network function.

In one example, the first network function may include 5GDDNMF, the second network function may include AAnF, the first key may include $K_{AF}$, and the second key may include $K_{AKMA}$.

Figure 10:
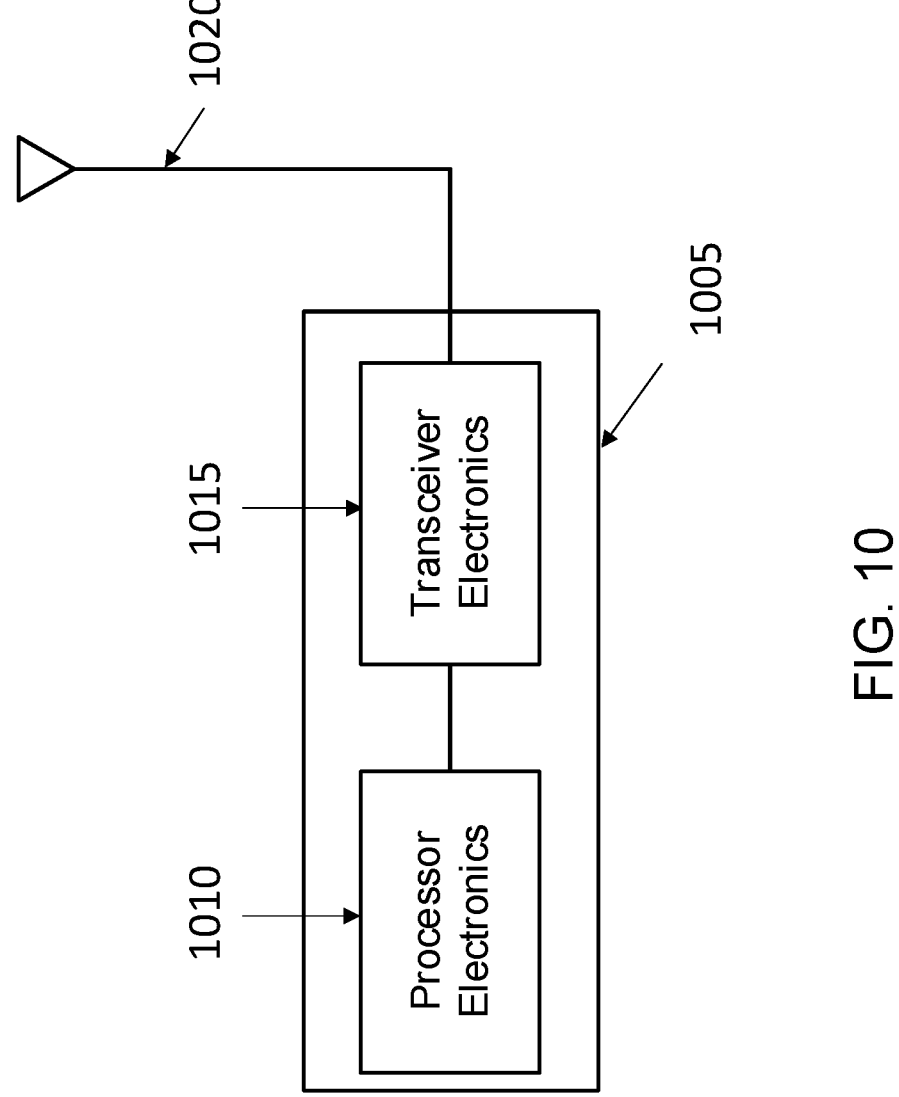
FIG. 10 is a block diagram representation of a portion of an apparatus that can be used to implement methods and/or techniques of the presently disclosed technology.

FIG. 10 is a block diagram representation of a portion of an apparatus, in accordance with some embodiments of the presently disclosed technology. An apparatus 1005 such as a network device or a base station or a wireless device (or UE), can include processor electronics 1010 such as a microprocessor that implements one or more of the techniques presented in this document. The apparatus 1005 can include transceiver electronics 1015 to send and/or receive wireless signals over one or more communication interfaces such as antenna(s) 1020. The apparatus 1005 can include other communication interfaces for transmitting and receiving data. Apparatus 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the apparatus 1005.

In some implementations, a wireless communication device includes one or more processors configured to generate an encrypted and integrity-protected message, and a transceiver configured to transmit the encrypted and integrity-protected message to a first network function, wherein the encrypted and integrity-protected message is encrypted using a first key that is derived from a second key, wherein the second key is established using a communication with a second network function, and wherein the encrypted and integrity-protected message is obtained by encrypting and integrity-protecting a message. Here, the first network function may include 5GDDNMF, the second network function may include AAnF, the first key may include $K_{AF}$, and the second key may include $K_{AKMA}$.

In some implementations, a network device includes a transceiver configured to receive an encrypted and integrity-protected message from a wireless device, and one or more processors configured to perform a first network function including decrypting the encrypted and integrity-protected message using a first key that is derived from a second key, wherein the encrypted and integrity-protected message is obtained by encrypting and integrity-protecting a message using the first key, and wherein the second key is established using a communication between the wireless device and a second network function. Here, the first network function may include 5GDDNMF, the second network function may include AAnF, the first key may include $K_{AF}$, and the second key may include $K_{AKMA}$.

Some embodiments may preferably implement one or more of the following solutions, listed in clause-format. The following clauses are supported and further described above and throughout this document. As used in the clauses below and in the claims, a wireless device or wireless communication device may be user equipment (UE), mobile station, or any other wireless terminal including fixed nodes such as base stations. A network device includes a base station including a next generation Node B (gNB), enhanced Node B (eNB), or any other device that performs as a base station, or a core network device that can perform the network functions discussed in this patent document. As noted above, the base station and/or core network perform the various functions including UDM, PCF, Network Exposure Function (NEF), DDNMF (e.g., 5GDDNMF), Unified Data Repository (UDR), AMF (Access and Mobility Management Function), Session Management Function (SMF), User Plane Function (UPF).

Clause 1. A method of wireless communication, comprising transmitting, by a wireless device to a first network function, an encrypted and integrity-protected message, wherein the encrypted and integrity-protected message is encrypted using a first key that is derived from a second key, wherein the wireless device has established the second key using a communication with a second network function, and wherein the encrypted and integrity-protected message is obtained by encrypting and integrity-protecting a message. Here, the wireless device may include UE, the first network function may include 5GDDNMF, the second network function may include AAnF, the first key may include $K_{AF}$, and the second key may include $K_{AKMA}$.

Clause 2. The method of clause 1, wherein the first key is used to obtain the encrypted and integrity-protected message by: generating, by the wireless device, an encryption key and an integrity key based on the first key; and encrypting the message using the encryption key and integrity-protecting the message using the integrity key.

Clause 3. The method of clause 1, wherein the first key includes an authentication and key management for applications (AKMA) application key, and the second key includes an AKMA anchor key.

Clause 4. The method of clause 1, wherein the encrypted and integrity-protected message includes a discovery request message that is transmitted through an interface for establishing proximity-based services.

Clause 5. The method of clause 1, wherein the discovery request message includes an AKMA key identifier (A-KID) and a message authentication code (MAC).

Clause 6. The method of clause 5, wherein, in a case that the first network function does not have an active context associated with the A-KID, the first network function transmits, to the second network function, a first request for acquiring the first key to be used by the wireless device.

Clause 7. The method of clause 6, wherein the first request includes an identity of the first network function that includes a fully qualified domain name (FQDN) and a security protocol identifier for a reference point that carries an application protocol.

Clause 8. The method of any of clauses 1-7, further comprising: receiving, by the wireless device, a discovery response message from the first network function; and checking a message authentication code (MAC) of the discovery response message and decrypting the discovery response message by using the first key or by using the encryption key and the integrity key generated based on the first key.

Clause 9. A method of wireless communication, comprising: receiving, by a first network function, an encrypted and integrity-protected message from a wireless device; and decrypting the encrypted and integrity-protected message using a first key that is derived from a second key, wherein the encrypted and integrity-protected message is obtained by encrypting and integrity-protecting a message using the first key, and wherein the second key is established using a communication between the wireless device and a second network function. Here, the first network function may include 5GDDNMF, the second network function may include AAnF, the first key may include $K_{AF}$, and the second key may include $K_{AKMA}$.

Clause 10. The method of clause 9, wherein the decrypting the encrypted and integrity-protected message using the first key comprises: generating an encryption key and an integrity key based on the first key; checking a message authentication code (MAC) of the encrypted and integrity-protected message using the integrity key; and decrypting the encrypted and integrity-protected message using the encryption key.

Clause 11. The method of clause 9, wherein the second network function determines whether the second network function is configured to provide a service to the first network function based on at least one of a configured local policy, authorization information, or a policy provided by a network repository function using an identity of the first network function.

Clause 12. The method of clause 9, wherein the second network function verifies whether a subscriber is authorized to use AKMA based on presence of the second key identified by an A-KID.

Clause 13. The method of clause 12, wherein, in a case that the second key is present in the second network function, the second network function derives the first key from the second key, or in a case that the second key is not present in the second network function, the second network function transmits, to an application function, a first response for responding to a first request for acquiring the first key, the first key, and an expiration time of the first key.

Clause 14. The method of clause 9, wherein the encrypted and integrity-protected message received from the wireless device includes a discovery request message that is transmitted through an interface for establishing proximity-based services.

Clause 15. The method of clause 14, further comprising: encrypting and integrity-protecting, by the first network function, a discovery response message based on the first key; and transmitting the encrypted and integrity-protected discovery response message to the wireless device.

Clause 16. The method of clause 15, wherein the first key is used to encrypt and integrity-protect the discovery response message by: generating an encryption key and an integrity key based on the first key; and encrypting the discovery response message using the encryption key and integrity-protecting the discovery response message using the integrity key.

Clause 17. The method of any of clauses 1-16, wherein the first network function includes a direct discovery name management function (DDNMF).

Clause 18. The method of any of clauses 1-16, wherein the second network function includes AKMA anchor function.

Clause 19. A wireless communication device, comprising: one or more processors configured to generate an encrypted and integrity-protected message; and a transceiver configured to transmit the encrypted and integrity-protected message to a first network function, wherein the encrypted and integrity-protected message is encrypted using a first key that is derived from a second key, wherein the second key is established using a communication with a second network function, and wherein the encrypted and integrity-protected message is obtained by encrypting and integrity-protecting a message. Here, the first network function may include 5GDDNMF, the second network function may include AAnF, the first key may include $K_{AF}$, and the second key may include $K_{AKMA}$.

Clause 20. The device of clause 19, wherein the first key is used to obtain the encrypted and integrity-protected message by: generating, by the wireless device, an encryption key and an integrity key based on the first key; and encrypting the message using the encryption key and integrity-protecting the message using the integrity key.

Clause 21. The device of clause 19, wherein the first key includes an authentication and key management for applications (AKMA) application key, and the second key includes an AKMA anchor key.

Clause 22. The device of clause 19, wherein the encrypted and integrity-protected message includes a discovery request message that is transmitted through an interface for establishing proximity-based services.

Clause 23. The device of clause 19, wherein the discovery request message includes an AKMA key identifier (A-KID) and a message authentication code (MAC).

Clause 24. The device of clause 23, wherein, in a case that the first network function does not have an active context associated with the A-KID, the first network function transmits, to the second network function, a first request for acquiring the first key to be used by the wireless device.

Clause 25. The device of clause 24, wherein the first request includes an identity of the first network function that includes a fully qualified domain name (FQDN) and a security protocol identifier for a reference point that carries an application protocol.

Clause 26. The device of any of clauses 19-25, wherein: the transceiver is further configured to receive a discovery response message from the first network function; and the one or more processors are further configured to check a message authentication code (MAC) of the discovery response message and perform a decryption on the discovery response message based on the first key or the encryption key and the integrity key generated based on the first key.

Clause 27. A network device, comprising: a transceiver configured to receive an encrypted and integrity-protected message from a wireless device; and one or more processors configured to perform a first network function including decrypting the encrypted and integrity-protected message using a first key that is derived from a second key, wherein the encrypted and integrity-protected message is obtained by encrypting and integrity-protecting a message using the first key, and wherein the second key is established using a communication between the wireless device and a second network function. Here, the first network function may include 5GDDNMF, the second network function may include AAnF, the first key may include $K_{AF}$, and the second key may include $K_{AKMA}$.

Clause 28. The device of clause 27, wherein the decrypting the encrypted and integrity-protected message using the first key comprises: generating an encryption key and an integrity key based on the first key; checking a message authentication code (MAC) of the encrypted and integrity-protected message using the integrity key; and decrypting the encrypted and integrity-protected message using the encryption key.

Clause 29. The device of clause 27, wherein the second network function determines whether the second network function is configured to provide a service to the first network function based on at least one of a configured local policy, authorization information, or a policy provided by a network repository function using an identity of the first network function.

Clause 30. The device of clause 27, wherein the second network function verifies whether a subscriber is authorized to use AKMA based on presence of the second key identified by an A-KID.

Clause 31. The device of clause 30, wherein, in a case that the second key is present in the second network function, the second network function derives the first key from the second key, or in a case that the second key is not present in the second network function, the second network function transmits, to an application function, a first response for responding to a first request for acquiring the first key, the first key, and an expiration time of the first key.

Clause 32. The device of clause 27, wherein the message received from the wireless device includes a discovery request message that is transmitted through an interface for establishing proximity-based services.

Clause 33. The device of clause 32, wherein: the one or more processors are further configured to encrypt and integrity-protect a discovery response message based on the first key; and the transceiver is further configured to transmit the encrypted and integrity-protected discovery response message to the wireless device.

Clause 34. The device of clause 33, wherein the first key is used to encrypt and integrity-protect the discovery response message by: generating an encryption key and an integrity key based on the first key; and encrypting the discovery response message using the encryption key and integrity-protecting the discovery response message using the encryption key.

Clause 35. An apparatus for wireless communication, comprising a processor, wherein the processor is configured to implement a method recited in any of clauses 1 to 18.

Clause 36. A computer readable program storage medium having code stored thereon, the code, when executed by a processor, causing the processor to implement a method recited in any of clauses 1 to 18.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

What is claimed is:

1. A method of wireless communication, comprising:
transmitting, by a wireless device to a first network function, an encrypted and integrity-protected message obtained by encrypting and integrity-protecting a first message,
wherein the encrypted and integrity-protected message is encrypted and a message authentication code (MAC) of the encrypted and integrity-protected message is calculated using either (1) an authentication and key management for applications (AKMA) application key $(K_{AF})$ that is derived from an authentication and key management for applications (AKMA) anchor key $(K_{AKMA})$, or (2) an encryption key $(K_{enc})$ and an integrity key $(K_{int})$ that are derived from the $K_{AF}$, and wherein the $K_{enc}$ is for use by the first network function to decrypt the encrypted and integrity-protected message in a case that the first network function is able to successfully check the MAC using the $K_{int}$, otherwise the $K_{AF}$ is for use by the first network function to check the MAC and decrypt the encrypted and integrity-protected message,
wherein the wireless device is configured to establish the $K_{AKMA}$ using a communication with a second network function.

2. The method of claim 1, wherein the $K_{AF}$ is used to obtain the encrypted and integrity-protected message by:
generating, by the wireless device, an encryption key and an integrity key based on the $K_{AF}$; and
encrypting and integrity-protecting the first message using the encryption key and the integrity key.

3. The method of claim 1, wherein the $K_{AF}$ includes the authentication and key management for applications (AKMA) application key, and the $K_{AKMA}$ includes the AKMA anchor key.

4. The method of claim 1, wherein the encrypted and integrity-protected message includes a discovery request message that is transmitted through an interface for establishing proximity-based services.

5. The method of claim 1, wherein the encrypted and integrity-protected message includes a discovery request message that includes an authentication and key management for applications (AKMA) key identifier (A-KID) and the MAC.

6. The method of claim 1, further comprising:

receiving, by the wireless device, a discovery response message from the first network function; and checking a message authentication code (MAC) of the discovery response message and decrypting the discovery response message by using the $K_{AF}$ or by using the encryption key and an integrity key generated based on the $K_{AF}$.

7. The method of claim 1, wherein the first network function includes a direct discovery name management function (DDNMF).

8. The method of claim 1, wherein the second network function includes AKMA anchor function.

9. A method of wireless communication, comprising:

receiving, by a first network function, from a wireless device, an encrypted and integrity-protected message obtained by encrypting and integrity-protecting a first message; and decrypting the encrypted and integrity-protected message using either (1) an authentication and key management for applications (AKMA) application key ($K_{AF}$) that is derived from an AKMA anchor key ($K_{AKMA}$), or (2) an encryption key ($K_{enc}$) and an integrity key ($K_{int}$) that are derived from the $K_{AF}$, wherein, in a case that the first network function successfully checks a message authentication code (MAC) of the encrypted and integrity-protected message by using the $K_{int}$, the first network function decrypts the encrypted and integrity-protected message using the $K_{enc}$, or in a case that the $K_{int}$ and Kene are unavailable, the first network function decrypts the encrypted and integrity-protected message using the $K_{AF}$, wherein the $K_{AKMA}$ is established using a communication between the wireless device and a second network function.

10. The method of claim 9, wherein the decrypting the encrypted and integrity-protected message using the $K_{AF}$ comprises:

generating an encryption key and an integrity key based on the $K_{AF}$;

checking the MAC of the encrypted and integrity-protected message using the integrity key; and decrypting the encrypted and integrity-protected message using the encryption key.

11. The method of claim 9, wherein the second network function determines whether the second network function is configured to provide a service to the first network function based on at least one of a configured local policy, authorization information, or a policy provided by a network repository function using an identity of the first network function.

12. The method of claim 9, wherein the second network function verifies whether a subscriber is authorized to use authentication and key management for applications (AKMA) based on presence of the $K_{AKMA}$ identified by an AKMA Key Identifier (A-KID).

13. The method of claim 9, wherein the encrypted and integrity-protected message received from the wireless device includes a discovery request message that is transmitted through an interface for establishing proximity-based services.

14. The method of claim 9, wherein the first network function includes a direct discovery name management function (DDNMF).

15. The method of claim 9, wherein the second network function includes authentication and key management for applications (AKMA) anchor function.

16. A wireless communication device, comprising:

one or more processors configured to generate an encrypted and integrity-protected message by encrypting and integrity-protecting a first message; and a transceiver configured to transmit the encrypted and integrity-protected message to a first network function, wherein the encrypted and integrity-protected message is encrypted and a message authentication code (MAC) of the encrypted and integrity-protected message is calculated using either (1) an authentication and key management for applications (AKMA) application key ($K_{AF}$) that is derived from an authentication and key management for applications (AKMA) anchor key ($K_{AKMA}$), or (2) an encryption key ($K_{enc}$) and an integrity key ($K_{int}$) that are derived from the $K_{AF}$, and wherein the $K_{enc}$ is for use by the first network function to decrypt the encrypted and integrity-protected message in a case that the first network function is able to successfully check the MAC using the $K_{int}$, otherwise the $K_{AF}$ is for use by the first network function to check the MAC and decrypt the encrypted and integrity-protected message, wherein the $K_{AKMA}$ is established using a communication with a second network function.

17. The device of claim 16, wherein the $K_{AF}$ is used to obtain the encrypted and integrity-protected message by:

generating, by the wireless device, an encryption key and an integrity key based on the $K_{AF}$; and encrypting and integrity-protecting the first message using the encryption key and the integrity key.

18. The device of claim 16, wherein the $K_{AF}$ includes the authentication and key management for applications (AKMA) application key, and the $K_{AKMA}$ includes the AKMA anchor key.

19. The device of claim 16, wherein the encrypted and integrity-protected message includes a discovery request message that is transmitted through an interface for establishing proximity-based services.

20. The device of claim 16, wherein the encrypted and integrity-protected message includes a discovery request message that includes an authentication and key management for applications (AKMA) key identifier (A-KID) and the MAC.

* * * * *